Sept. 11, 1956 F. JANATA 2,762,186
HEDGE-TRIMMING MACHINE
Filed April 22, 1955 2 Sheets-Sheet 1
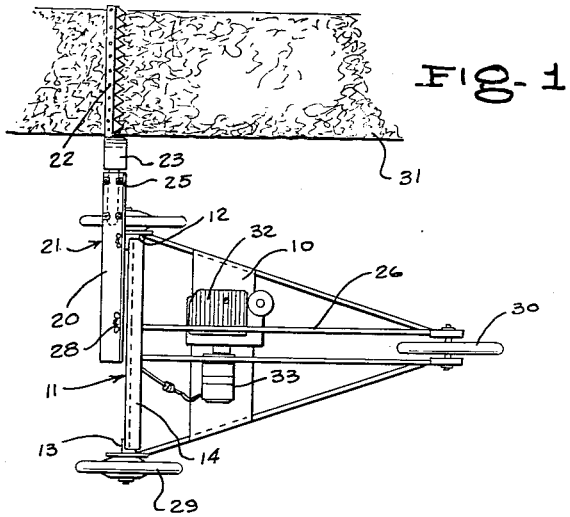
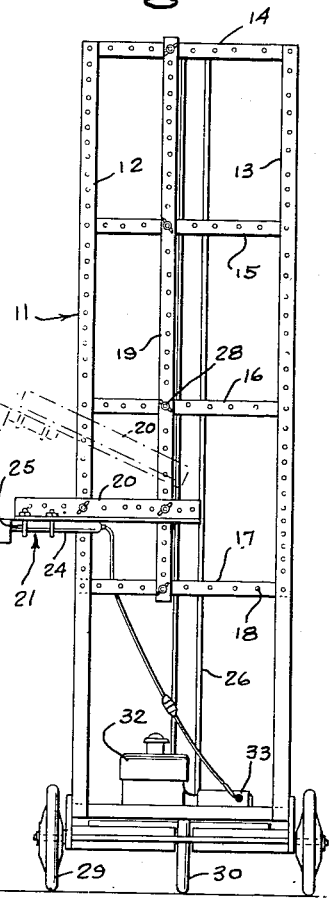
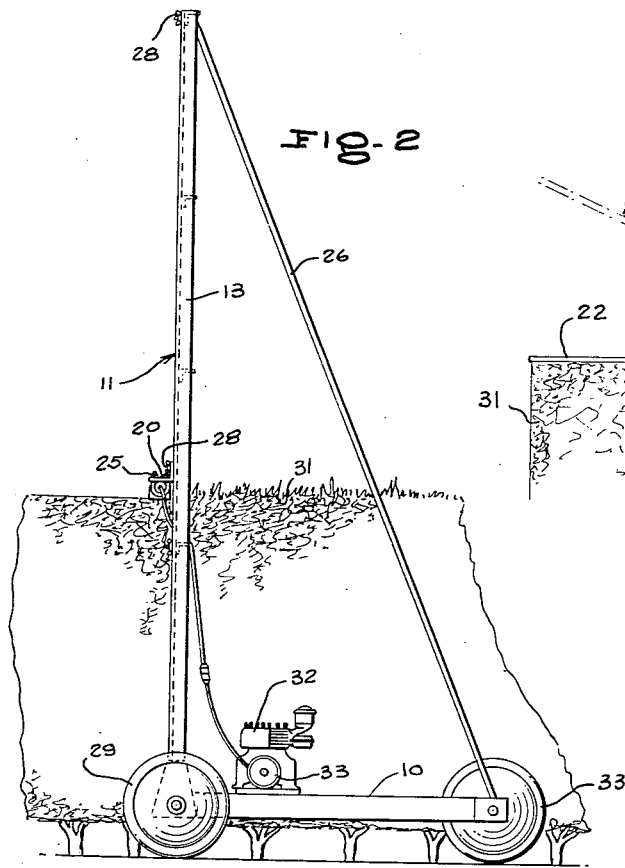
INVENTOR.
FRANK JANATA
BY
McMorrow, Berman + Davidson
ATTORNEYS Sept. 11, 1956  F. JANATA  2,762,186
HEDGE-TRIMMING MACHINE
Filed April 22, 1955  2 Sheets-Sheet 2
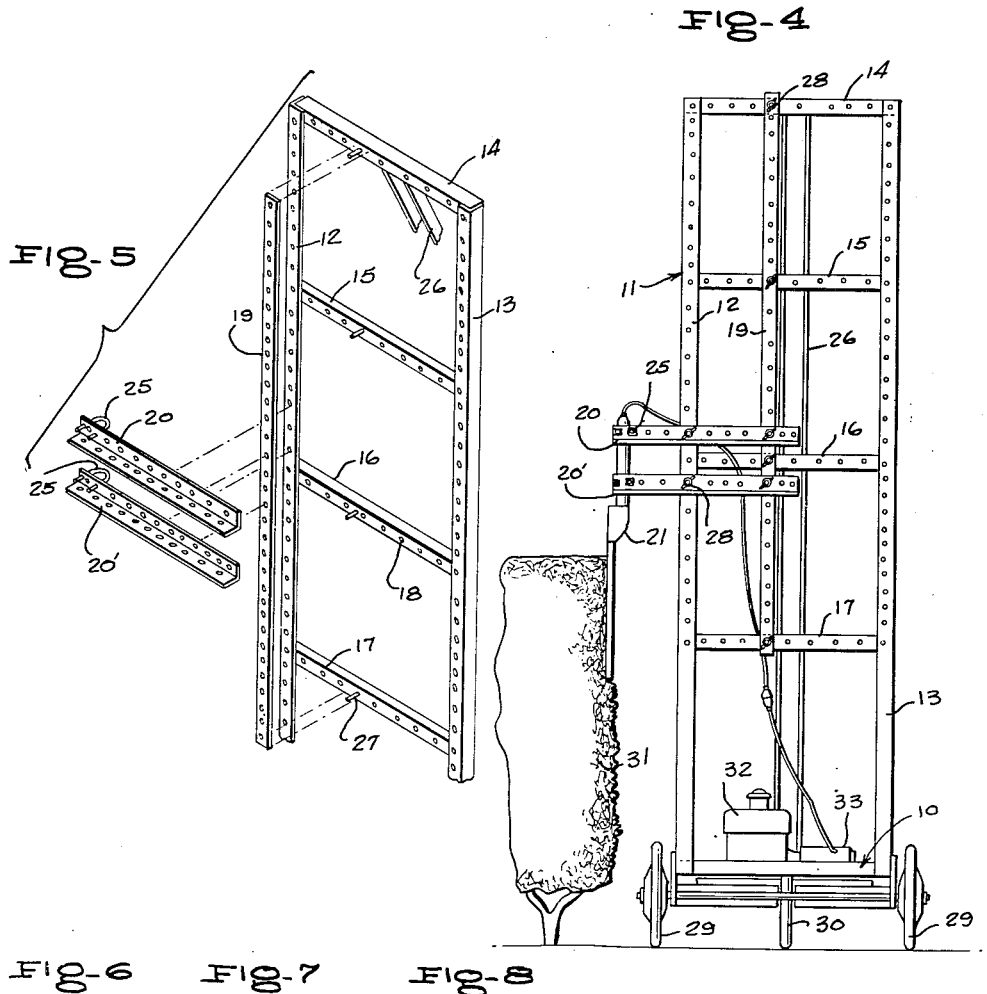
INVENTOR.
FRANK JANATA
BY
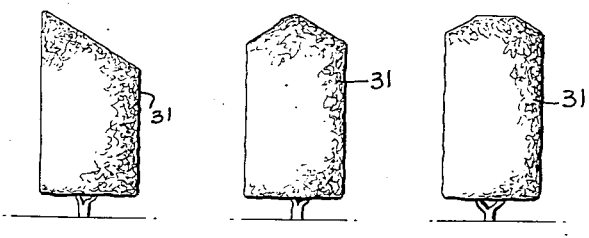
ATTORNEYS

United States Patent Office 2,762,186
Patented Sept. 11, 1956

2,762,186

HEDGE-TRIMMING MACHINE

Frank Janata, Jensen Beach, Fla.

Application April 22, 1955, Serial No. 503,118

3 Claims. (Cl. 56—233)

The present invention relates to machines for trimming hedges and in particular to one which cuts the top and sides of a hedge at any angle.

The primary object of the present invention is to provide an electric hedge-trimming machine which has its own source of electric power and may be used to trim hedges located remotely from a source of electricity.

Another object of the present invention is to provide a hedge-trimming machine which may be adjusted to cut the tops and sides of a hedge at any angle with respect to the vertical.

A further object of the present invention is to provide a hedge-trimming machine which is sturdy in construction, one economical to manufacture and assemble, and one which may be readily and easily adjusted for cutting all shapes of hedges and all heights of hedges.

These and other objects and advantages of the present invention will be fully apparent from the following description when taken in connection with the annexed drawings, in which:

Figure 1 is a top plan view of the hedge-trimming machine of the present invention showing it in operation trimming the top of a hedge, Figure 2 is a side view in elevation of the assembly shown in Figure 1, Figure 3 is an end view of the present invention showing in dotted lines the adjusted position to cut the top of a hedge at an angle to the vertical, Figure 4 is an end view showing the machine of the present invention assembled so as to cut the sides of a hedge, Figure 5 is an exploded view in perspective showing the elements of the frame of the present invention, Figure 6 is an end view greatly reduced of a hedge showing how a single oblique cut may be made in its top, Figure 7 is another end view of a hedge showing how two oblique cuts may be performed by the machine of the present invention on top of the hedge, and Figure 8 shows another end view of a hedge showing a pair of oblique cuts topped by a horizontal cut.

Referring in greater detail to the drawings in which like numerals indicate like parts throughout the several views, the present invention consists of a hedge-trimming machine comprising a wheel supported and rollable base 10 adapted to roll upon the ground adjacent to a hedge along one side thereof. Rising from the rear end of the base 10 is a vertically extending frame indicated generally by the reference numeral 11 having side members 12 and 13, a top cross member 14, and intermediately disposed crossbars 15, 16, and 17 disposed at spaced intervals between the side members 12 and 13 and having their ends connected to the adjacent one of the side members.

The top cross member 14 and each of the crossbars 15, 16, and 17 are provided with a plurality of spaced apertures, one of them indicated in Figure 3 by the reference numeral 18, by means of which the intermediately disposed support member 19 is selectively connectable to the top cross member 14 and the crossbars 15 to 17, inclusive.

An arm 20, fabricated of angle wire or steel, is shown in full lines in Figures 1 to 3 and having one end projecting horizontally outwardly from the frame 11 adjacent the one side member 12 with its other end detachably secured to the support member 19 and its intermediate portion detachably secured to the one side member 12.

An electrically-driven sickle bar assembly indicated generally by the reference numeral 21, having a blade portion 22, a motor 23, and a handle 24, is supported on the arm 20 with a pair of U-bolts 25 embracingly engaging the handle 24 and projecting through spaced apertures provided in the projecting end portion of the arm 20.

In Figure 3, the sickle bar assembly 21 and the arm 20 are shown in dotted lines in an adjusted position at an angle to the vertical so as to trim a hedge to an angularly disposed top, as in Figures 6 to 8, inclusive. The depth of the cut of Figures 7 and 8 is determined by the position of the frame relative to the near side of the hedge.

A pair of bars 26 extend from the front end of the base 10 to the top of the frame 11 in order to brace the latter in its vertical position.

In Figure 4 it will be seen that the sickle bar assembly 21 has been moved to a vertical position with its handle held between the projecting ends of a pair of arms 20 and 20', U-bolts 25 serving to secure the handle 24 of the sickle bar assembly in this position.

In Figure 5 the many components of the frame are shown in exploded perspective view with bolts 27 shown in their one adjusted position for holding the support member 19. Wing nuts 28 (Figures 1 to 4) provide a convenient method for securing the support member 19 and the arms 20 or 20' to the frame.

A pair of rear wheels 29 and a single front wheel 30 support the base 10 upon the ground for rolling movement along one side of a hedge 31.

As shown in Figures 1 to 3, the sickle bar assembly may be adjustably positioned upon the frame 11 so as to cut a horizontally disposed upper surface on the hedge 31, and, as seen in Figure 4, the sickle bar assembly 21 may be adjustably positioned relative to the frame 11 so as to cut vertically disposed sides on the hedge 31.

In Figures 6 to 8, inclusive, the hedge 31 has been shaped by the hedge-trimming machine of the present invention so as to have obliquely configured top surfaces and vertically disposed sides.

A gasoline engine 32 is supported on the base and is connected to a generator 33 which supplies electrical current, either A. C. or D. C., as required, to the electric motor 23 of the sickle bar assembly 21.

The electric motor 23 may also be powered by electric current normally used in residences, with the gasoline engine 32 used to generate the current when such house current is not available.

What is claimed is:

1. A hedge-trimming machine comprising a rollable base, a vertically disposed frame rising from said base, said frame including a pair of side members and a plurality of horizontally disposed cross members arranged in superimposed spaced relation connecting said side members together, a vertically disposed support member positioned on one side of said frame intermediate said side members and selectively attachable to said cross members in any position toward and away from said side members of said frame, a power sickle bar assembly positioned exteriorly of and transversely of said frame and having one end connectible to said support member and having an intermediate portion selectively connectible to one of said side members in a horizontal position or any position at an angle to the horizontal therealong.

2. A hedge-trimming machine comprising a rollable base, a vertically disposed frame rising from said base at one end thereof, said frame including a pair of side members and a plurality of horizontally disposed cross members arranged in superimposed spaced relation connecting said side members together, a vertically disposed support member positioned on one side of said frame intermediate said side members and selectively attachable to said cross members in any position toward and away from said side members of said frame, an arm having one end projecting horizontally outwardly from one of said frame side members and having the portion inwardly of the other end selectively connectible to said support member and said one side member in a horizontal position or any position at an angle to the horizontal, a power sickle bar assembly positioned exteriorly of and transversely of said frame and supported on the portion adjacent said one end of said arm, and means for supplying power to said assembly.

3. A hedge-trimming machine comprising a rollable base, a vertically disposed frame rising from said base at one end thereof, said frame including a pair of side members and a plurality of horizontally disposed cross members arranged in superimposed spaced relation connecting said side members together, a vertically disposed support member positioned on one side of said frame intermediate said side members and selectively attachable to said cross members in any position toward and away from said side members of said frame, an arm having one end projecting horizontally outwardly from one of said frame side members and having the portion inwardly of the other end selectively connectible to said support member and said side member in a horizontal position or any position at an angle to the horizontal, a power sickle bar assembly positioned exteriorly of and transversely of said frame and supported on the portion adjacent said one end of said arm, and a power generator carried on said base operatively connected to said sickle bar assembly.

References Cited in the file of this patent

UNITED STATES PATENTS

| 1,627,258 | Sullivan | May 3, 1927 |
| 1,930,934 | Healy | Oct. 17, 1933 |
| 2,161,357 | Kaplan | June 6, 1939 |

FOREIGN PATENTS

| 698,437 | Great Britain | Oct. 14, 1953 |